US009500877B2

(12) United States Patent
Miura (10) Patent No.: US 9,500,877 B2
(45) Date of Patent: Nov. 22, 2016

(54) LENS DRIVING UNIT, AND LENS APPARATUS AND IMAGE PICKUP APPARATUS INCLUDING THE SAME (71) Applicant: CANON KABUSHIKI KAISHA, Tokyo (JP)

(72) Inventor: Atsushi Miura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 13/664,488

(22) Filed: Oct. 31, 2012

(65) Prior Publication Data
US 2013/0107380 A1 May 2, 2013

(30) Foreign Application Priority Data

Nov. 1, 2011 (JP) .................. 2011-239907

(51) Int. Cl.
G02B 7/02 (2006.01)
G02B 27/64 (2006.01)
G03B 5/02 (2006.01)

(52) U.S. Cl.
CPC ............ G02B 27/646 (2013.01); G03B 5/02 (2013.01); G03B 2205/0015 (2013.01); G03B 2205/0053 (2013.01)

(58) Field of Classification Search
CPC .................. G02B 27/646; G03B 5/02; G03B 2205/0053; G03B 2205/0015
USPC ........................ 359/824, 822, 814
See application file for complete search history.

(56) References Cited

U.S. PATENT DOCUMENTS 5,471,100 A 11/1995 Sakamoto et al.
6,539,174 B1 3/2003 Tanii et al.
(Continued)

FOREIGN PATENT DOCUMENTS

CN 1094820 A 11/1994
CN 101071250 A 11/2007
(Continued)

OTHER PUBLICATIONS

Extended European Search Report issued Mar. 7, 2013 for corres. EP 12007157.6.
(Continued)

Primary Examiner — Alicia M Harrington
(74) Attorney, Agent, or Firm — Rossi, Kimms & McDowell LLP (57) ABSTRACT A lens driver moving a lens perpendicularly to optical axis, the lens driver including: fined member; movable member holding the lens; spacer interposed therebetween with the members being movable to each other perpendicularly to optical axis; biasing unit biasing the movable member toward the fixed member; detector for detecting position of the movable member relative to the fixed member in plane perpendicular to optical axis; driver driving the movable member relative to the fixed member perpendicularly to optical axis; controller controlling the driver based on position of the movable member; and range definer defining: movable position having large movable range between the members in the perpendicular plane; and fixed position having small movable range between the members in the perpendicular plane based on rotation position about optical axis where sliding friction is generated between the spacer and one of the members, or between the driving unit and the movable member.

16 Claims, 6 Drawing Sheets (56) References Cited

U.S. PATENT DOCUMENTS

| | | |
|---|---|---|
| 7,720,366 B2 | 5/2010 | Iwasaki et al. |
| 8,090,248 B2 | 1/2012 | Akutsu et al. |
| 2004/0022530 A1 | 2/2004 | Okazaki et al. |
| 2006/0127074 A1* | 6/2006 | Noji .................. G03B 5/00 396/55 |
| 2008/0008463 A1 | 1/2008 | Otsuka et al. |
| 2010/0053784 A1* | 3/2010 | Kang et al. .................. 359/824 |
| 2011/0181740 A1 | 7/2011 | Watanabe et al. |

FOREIGN PATENT DOCUMENTS

| | | |
|---|---|---|
| CN | 101799612 A | 8/2010 |
| CN | 102165368 A | 8/2011 |
| JP | 2001147458 A | 5/2001 |
| JP | 2006163354 A | 6/2006 |
| JP | 4011576 A | 11/2007 |
| JP | 2008-015349 A | 1/2008 |
| JP | 2008287159 A | 11/2008 |
| JP | 2008304532 A | 12/2008 |
| JP | 2010072562 A | 4/2010 |

OTHER PUBLICATIONS

Chinese office Action cited in Chinese counterpart application No. CN201210419494.8, dated Aug. 5, 2014. English translation provided.

Japanese Office Action issued in Japanese counterpart application No. JP2011-239907, dated Sep. 3, 2015.

* cited by examiner

LENS DRIVING UNIT, AND LENS APPARATUS AND IMAGE PICKUP APPARATUS INCLUDING THE SAME

BACKGROUND OF THE INVENTION

1. Field of the Invention

The present invention relates to a lens driving unit including a driving unit.

2. Description of the Related Art

Conventionally, a lens apparatus including a correction lens that is moved in a translational movement in a plane perpendicular to an optical axis so as to suppress an image shake is well known, and an apparatus including a retention mechanism for restricting and fixing movement of a movable member including the correction lens when image stabilisation is not performed is also known.

Japanese Patent No. 4,011,576 discloses an apparatus in which, when the image stabilisation is not performed, the movable member including the correction lens is rotated so that a locking element reception portion of a fixed member and a locking element of the movable member are engaged at a predetermined position, and hence the movable member is locked at a position matching an optical axis. In this position, the movable member is biased toward the locking element reception portion by a magnetic repulsion force, and hence the position is retained.

Japanese Patent Application Laid-Open No. 2008-015349 discloses an apparatus in which the movable member is retained at a position by a magnetic attraction force in the state where the movable member including the correction lens is locked with the fixed member by the same method as disclosed in Japanese Patent No. 4,011,576.

However, in the conventional technologies disclosed in Japanese Patent Application Laid-Open No. 2008-015349 and Japanese Patent No. 4,011,576, a posture of the correction lens is mechanically determined when the locking element of the movable member abuts on the locking element reception portion of the fixed member. Therefore, in a locked state, the posture of the correction lens is determined with a deviation from the optical axis by a play of the locking element in a radial direction, and thus the optical performance is deteriorated. In addition, in a long-term use, wear or deformation occurs in the locking element, and hence positioning accuracy of the correction lens is deteriorated with time. In addition, because it is necessary to provide an abutting portion, the shape of a component is complicated, which causes an increase of cost.

SUMMARY OF THE INVENTION

Therefore, the present invention provides a lens driving unit capable of simplifying the shape of the component, positioning the correction lens accurately, and reducing the change in positioning accuracy of the correction lens with time in a long-term use.

According to an exemplary embodiment of the present invention, there is provided a lens driving unit for moving a lens in a lens apparatus in a direction perpendicular to an optical axis of the lens apparatus, the lens driving unit including: a fixed member; a movable member to which the lens is fixed; a spacer interposed between the fixed member and the movable member in a state where the fixed member and the movable member are movable relatively to each other in the direction perpendicular to the optical axis of the lens; a biasing unit for biasing the movable member toward the fixed member; a position detector for detecting a position of the movable member with respect to the fixed member in a plane perpendicular to the optical axis of the lens; a driving unit for driving the movable member with respect to the fixed member in the direction perpendicular to the optical axis; a controller for controlling the drive unit to drive the movable member based on the position of the movable member detected by the position detector; and a movable range defining unit for defining a movable position having a large relative movable range between the fixed member and the movable member in the plane perpendicular to the optical axis and a fixed position having a small relative movable range between the fixed member and the movable member in the plane perpendicular to the optical axis based on a relative rotation position of the fixed member and the movable member about the optical axis of the lens, in which, in the fixed position, a sliding friction force is generated between the spacer and one of the fixed member and the movable member or between the driving unit and the movable member.

According to the present invention, it is possible to provide the lens driving unit capable of further simplifying the shape of the component, positioning the correction lens accurately, and reducing the change in positioning accuracy of the correction lens with time in a long-term use.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings.

First Embodiment

Hereinafter, with reference to FIGS. 1 to 5, a lens driving unit according to a first embodiment of the present invention is described in detail.

Figure 1:
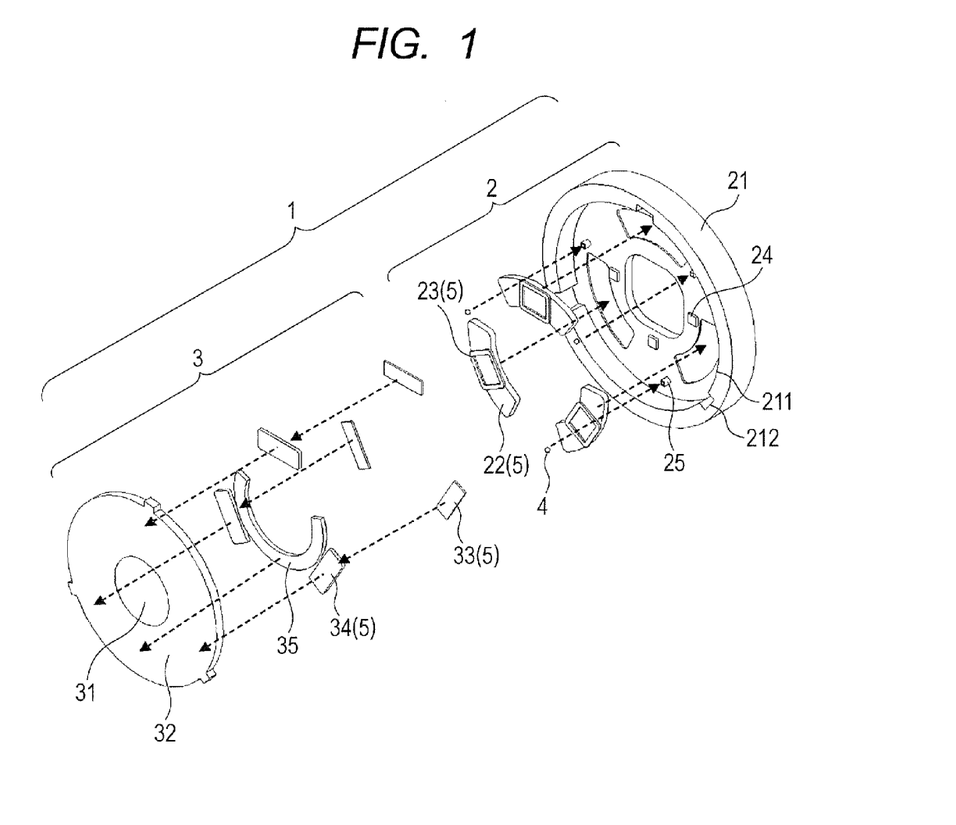
FIG. 1 is an exploded perspective view of a lens driving unit according to a first embodiment of the present invention.
Figure 2A:
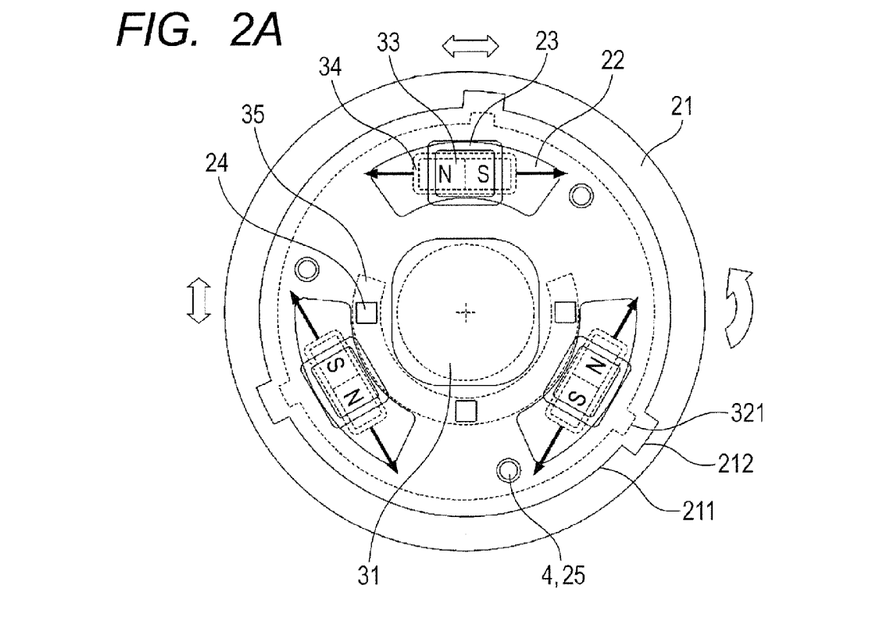
FIG. 2A is a front view of the lens driving unit when image stabilisation is performed according to the first embodiment.
Figure 2B:
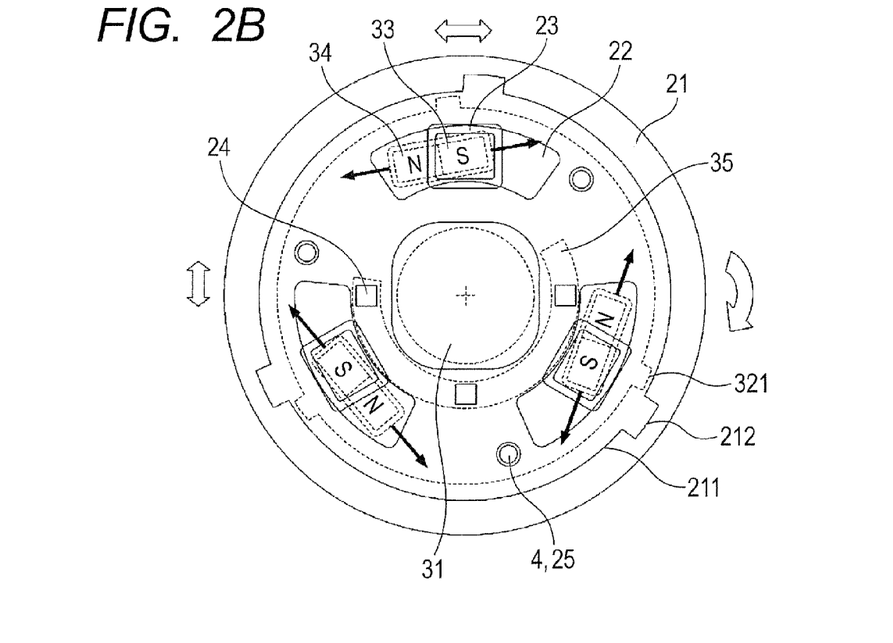
FIG. 2B is a front view of the lens driving unit when the image stabilisation is not performed according to the first embodiment.
Figure 3:
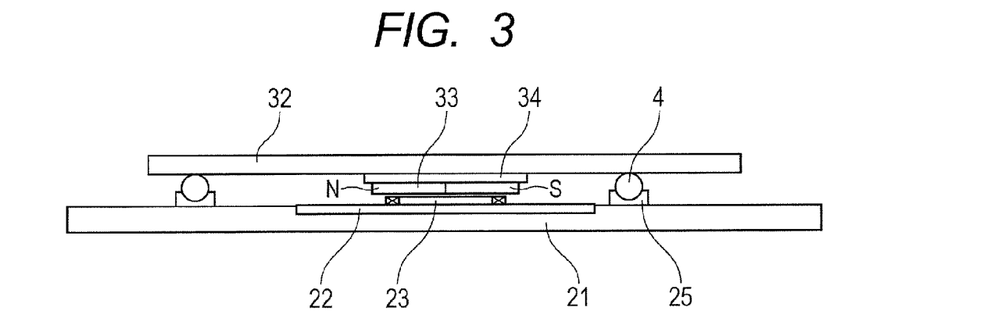
FIG. 3 is a schematic top view of FIG. 2A.
Figure 4:
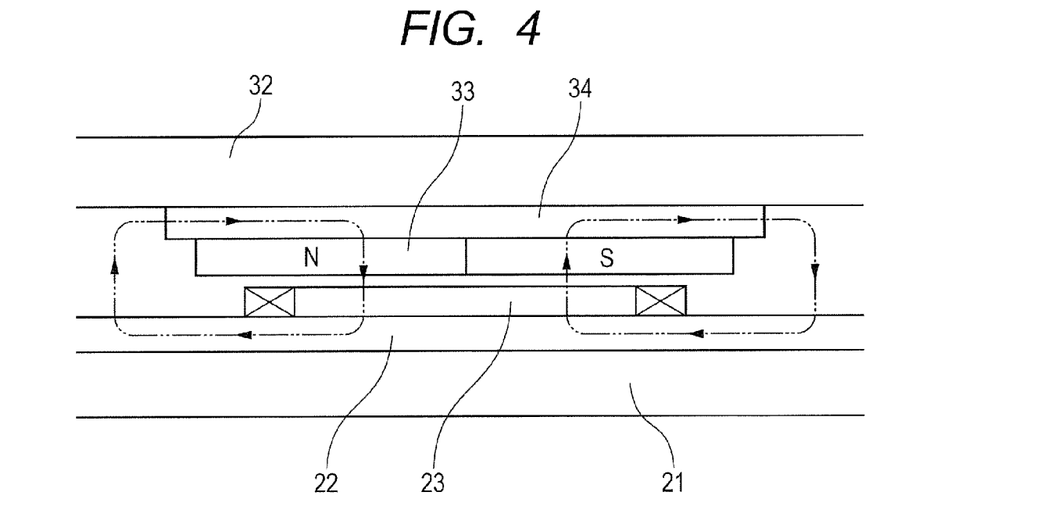
FIG. 4 is a partially enlarged view of a drive unit and the vicinity thereof according to the first embodiment.

FIG. 1 is an exploded perspective view of a lens driving unit according to the first embodiment. FIG. 2A is a front view of the lens driving unit when an image stabilising function is effective (hereinafter referred to as "image-stabilization state"). FIG. 2B is a front view of the lens driving unit when the image stabilization is not performed (hereinafter referred to as "no-image-stabilization state"). In FIGS. 2A and 2B, in order to facilitate understanding of the structure, a fixed unit and balls described later are indicated by solid lines while a movable unit is indicated by broken lines. FIG. 3 is a schematic top view of FIG. 2A, for illustrating a structure of the drive unit and the vicinity thereof in a simplified manner. FIG. 4 is a partially enlarged view of FIG. 3. Note that, a voice coil motor that is usually known is used as a driving unit in this embodiment.

In FIG. 1, a lens driving unit 1 includes a fixed unit (fixed member) 2 fixed integrally with a lens barrel or the like in a lens apparatus for imaging (not shown), a movable unit (movable member) 3 that includes a correction lens 31 and changes its relative position with respect to the fixed unit 2, and three balls (spacers) 4 interposed between the movable unit 3 and the fixed unit 2.

The fixed unit 2 includes a retaining plate 21 as a reference member for the lens driving unit 1, three attraction yokes 22 fixed to the retaining plate 21 at substantially every 120 degrees, and three driving coils 23 fixed to the attraction yokes 22. In addition, the fixed unit 2 includes three position detectors 24 for detecting a position of the movable unit 3, and ball reception portions 25 for receiving the three balls 4 disposed between the fixed unit 2 and the movable unit 3. The retaining plate 21 includes a fitting portion 211 to which a protrusion 321 of a moving plate 32 of the movable unit 3 described later is fitted with a predetermined play when the image stabilization is not performed, and a fit release portion 212 for releasing the fit with the protrusion 321 of the moving plate 32 when the image stabilisation is performed. In other words, the fitting portion 211, the fit release portion 212, and the protrusion 321 of the fixed unit 2 and the movable unit 3 constitute a movable range defining unit, which defines a movable position having a large relative movable range in a plane perpendicular to the optical axis and a fixed position having a small relative movable range in the plane perpendicular to the optical axis based on a relative rotation position about the optical axis of the correction lens 31 retained by the moving plate 32.

The movable unit 3 includes the moving plate 32 made of a non-magnetic material and retaining the correction lens 31 for performing the image stabilization, the protrusions 321 disposed on the moving plate 32, permanent magnets 33, and back yokes 34 disposed on the permanent magnets 33 on the moving plate 32 side. The permanent magnet 33 is magnetized so as to have the north pole on one side and the south pole on the other side with respect to the center line as a boundary as illustrated in FIGS. 3 and 4, and is interposed between the attraction yoke 22 and the back yoke 34 so as to form a closed magnetic circuit as illustrated in FIG. 4. In addition, a belt-shaped position detecting scale 35 is disposed at a position opposed to the position detectors 24. The position detecting scale 35 has a size which is large enough for the position detectors 24 of the fixed unit 2 to face the position defecting scale 35 even if the movable unit 3 moves in the maximum movable range.

For the sake of convenience for the following description, the attraction yoke 22 and the driving coil 23 of the fixed unit 2, and the permanent magnet 33 and the back yoke 34 of the movable unit 3 are integrally referred to as a drive unit 5.

Next, a method of supporting the fixed unit 2 and the movable unit 3 is described with reference to FIGS. 2A, 2B, and 3. The movable unit 3 is attracted to the fixed unit 2 so that the permanent magnet 33 attracts the attraction yoke 22 made of a magnetic material. The three balls 4 are interposed between the retaining plats 21 and the moving plate 32 while being housed in holes of the ball reception portions 25 disposed in the retaining plate 21. The ball 4 rotates in the hole of the ball reception portion 25 along with movement of the moving plate 32 so as to support the moving plate 32 with respect to the fixed unit 2 in a plane perpendicular to the optical axis in a movable state and to always maintain a constant distance between the moving plate 32 and the retaining plate 21.

Next, a method of driving the movable unit 3 by the drive unit 5 is described. In the state illustrated in FIG. 4, the center of the driving coil 23 is on the center line of the permanent magnet 33. The permanent magnet 33 exhibits a magnetic force illustrated by lines of a magnetic force as indicated by arrows in FIG. 4. When the driving coil 23 is applied with electric current, an electromagnetic force is generated. A direction and intensity of the generated force can be adjusted by a direction and quantity of the applied current. In FIGS. 2A and 2B, the electric current flowing in the clockwise direction causes a force for moving the movable unit 3 in a clockwise direction, and the electric current flowing in the counterclockwise direction causes a force for moving the movable unit 3 in a counterclockwise direction. By adjusting the electric currents flowing respectively in the three driving coils 23, the movable unit 3 moves in translational movement and rotates in the plane perpendicular to the optical axis.

Next, a method of controlling the lens driving unit 1 in the image-stabilization state is described. In the image-stabilization state, a vibration amount is first input from a vibration detection sensor of a camera or lens body (not shown) to a CPU for the lens driving unit serving as a drive controller (not shown). The CPU calculates a drive amount of the correction lens necessary for stabilizing the image based on the input vibration amount and outputs the drive amount based on the calculated drive amount as electric current signal to the three drive units 5. The drive unit 5 drives the moving plate 32 to move in translational movement in the plane perpendicular to the optical axis based on the electric current signal. Position information of the moving plate 32 is detected by reading the position detecting scale 35 by the three position detectors 24, and the position information is fed back to the CPU. The CPU calculates the drive amount of the correction lens 31 based on the fed-back position information and a newly input vibration amount from the vibration detection sensor, and outputs the electric current signal based on the calculated drive amount to the drive unit 5. By repeatedly performing the above-mentioned operation, the lens driving unit 1 continuously performs the image stabilisation.

Figure 5:
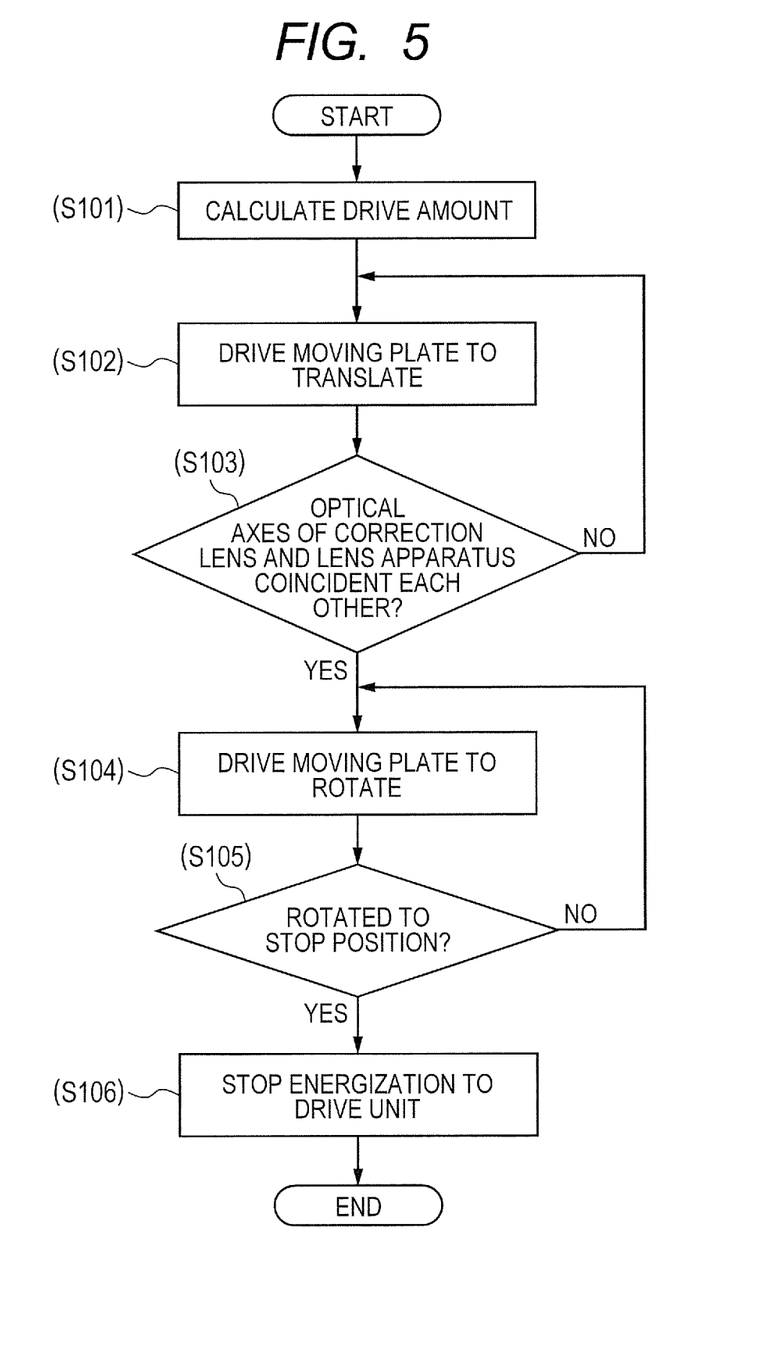
FIG. 5 is a flowchart to be performed when a movable unit is locked according to the first embodiment.

Next, a method of retaining (locking) the movable unit 3 in the non-image-stabilisation state is described with reference to FIGS. 2A, 2B, and 5. FIG. 5 is a flowchart illustrating a method of controlling the movable unit 3 to a locked state.

When the lens driving unit 1 receives a signal for stopping the image stabilization from a camera or a lens, the CPU calculates a drive amount necessary for adjusting the optical axis of the correction lens 31 coincident with the optical axis of the lens apparatus from optical axis center information of the lens apparatus recorded in advance and the position information of the moving plate 32. After that, the calculated drive amount is converted into the current signal, and the electric current signal is output to each drive unit 5 (S101). Each drive unit 5 drives the moving plate 32 to move in translational movement to a position where the optical axis of the correction lens 31 is coincident with the optical axis of the lens apparatus based on the electric current signal (S102 and S103). Next, the moving plate 32 is rotated about the optical axis by a predetermined amount to a position (lock position) where a phase of the protrusion 321 of the movable unit 3 is coincident with a phase of the fitting portion 211 of the fixed unit 2 (S104). When the position detector 24 detects that the moving plate 32 has rotated to the lock position (S105), the CPU stops energization to the drive unit 5 (S106). The permanent magnets 33 continuously attract the attraction yokes 22 so that the movable unit 3 maintains the state of causing the three balls 4 to be biased toward the holes of the ball reception portions 25 in the retaining plate 21 by a predetermined biasing force even when the energization is not performed. In the state where the balls 4 are interposed between the retaining plate 21 and the moving plate 32, the balls 4 are held in contact with the ball reception portions 25 at least at a plurality of points. Therefore, a sliding friction force works between the balls 4 and the ball reception portions 25. In addition, because the balls 4 come into contact with a surface of the moving plate 32, a rolling friction force works between the balls 4 and the moving plate 32. Because the rolling friction force is smaller than the sliding friction force, mainly the sliding friction force between the balls 4 and the ball reception portions 25 works as a retaining force for retaining a posture of the movable unit 3 with respect to the fixed unit 2. As described above, the posture of the movable unit 3 is maintained in the non-image-stabilisation state, and hence it is possible to retain the position of the optical axis of the correction lens 31 at the position coincident with the optical axis of the lens apparatus. Note that, the retaining plate 21 (fixed unit 2) includes the ball reception portions 25 in this case, but the same effect can be obtained also when the moving plats 32 (movable unit 3) includes the ball reception portions 25.

If an external force such as an impact is applied to the lens apparatus so that a position of the correction lens 31 is changed, it is possible to control the displacement to be within a predetermined fit clearance at most. Therefore, the position of the movable unit 3 can be retained without a significant deviation of the optical axis of the correction lens 31 from the optical axis of the lens apparatus (reference position). Note that, if a deviation of the position of the movable unit 3 occurs in a state where the lens apparatus is powered on, the CPU detects a change of an output value of the position detector and controls the drive unit 5 to move the movable unit 3 to a position where the optical axis of the correction lens 31 is coincident with the optical axis of the lens apparatus. If a deviation of the position of the movable unit 3 occurs in a state where the lens apparatus is not powered on, when the power is turned on, the CPU calculates an amount of positional deviation (an amount of movement from the reference position including a direction and a distance) from a change of the output value of the position detector, and controls the drive unit 5 to move the movable unit 3 to the position where the optical axis of the correction lens 31 is coincident with the optical axis of the lens apparatus.

When the lock is released (when switching to the image-stabilization state), the control is performed in the opposite direction to that of the flow of FIG. 5, and the movable unit 3 is rotated by a predetermined amount to a position at which the fit is released so that the lock is released.

With the above-mentioned structure, when the image stabilisation is not performed, the position of the movable unit 3 including the correction lens can be retained at a position where the optical axis of the correction lens 31 is coincident with the optical axis of the lens apparatus. Therefore, good optical performance can be obtained. In addition, it is not particularly necessary to provide a mechanical locking element. Therefore, the component shape can further be simplified, the component cost can be reduced, and the posture of the correction lens 31 can be retained stably without a change with time in a long-term use.

Note that, the attraction yoke and the driving coil are disposed on the fixed unit while the permanent magnet and the back yoke are disposed on the movable unit in this embodiment, but the same effect can be obtained also when the permanent magnet and the back yoke are disposed on the fixed unit while the driving coil and the attraction yoke are disposed on the movable unit as a counterpart. In addition, because the effect of the yoke can be obtained by using a magnetic material for the moving plate, the back yoke becomes unnecessary so that the number of components can further be reduced.

In addition, in this embodiment, after adjusting the center position of the correction lens 31 coincident with the position of the optical axis, the movable unit 3 is controlled to rotate to the lock position, but it is possible to simultaneously control the translational movement to the optical axis center of the correction lens 31 and the rotational movement to the lock position.

Second Embodiment

Figure 6A:
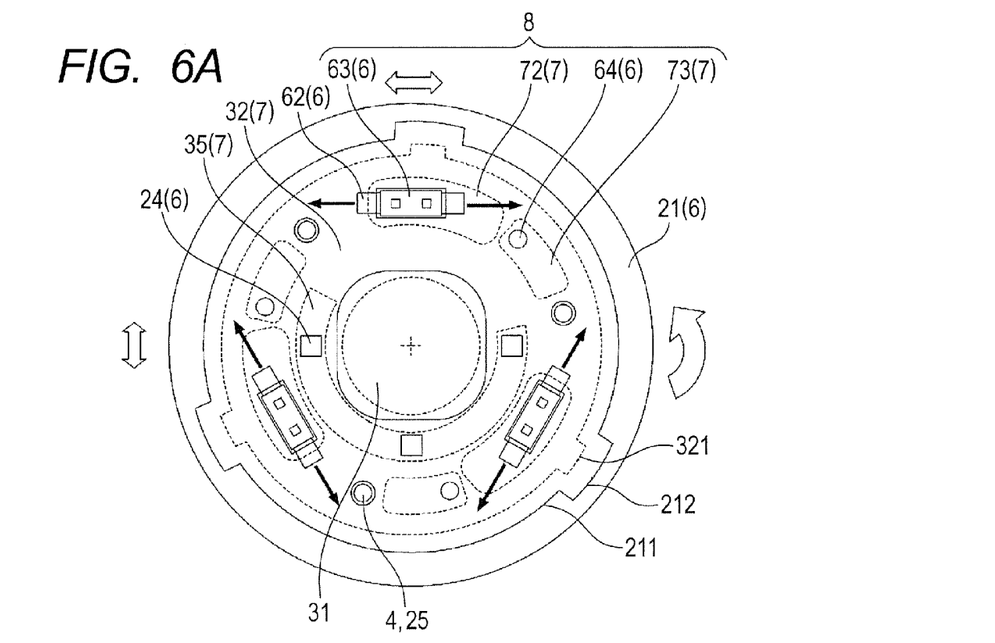
FIG. 6A is a front view of a lens driving unit when the image stabilization is performed according to a second embodiment of the present invention.
Figure 6B:
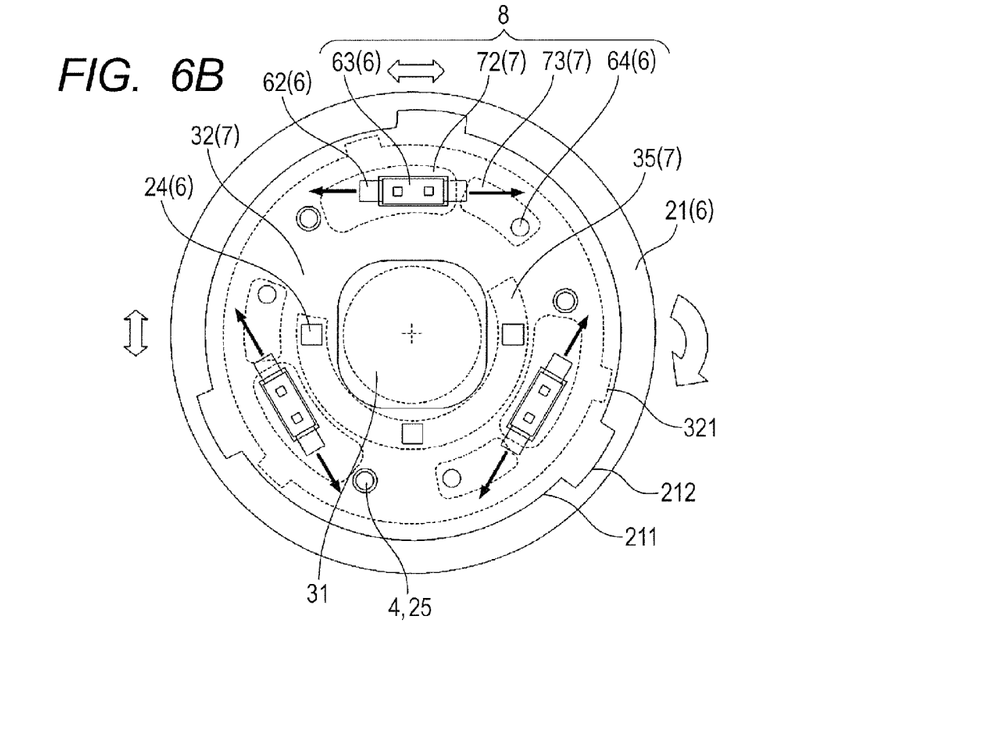
FIG. 6B is a front view of the lens driving unit when the image stabilization is not performed according to the second embodiment.
Figure 7:
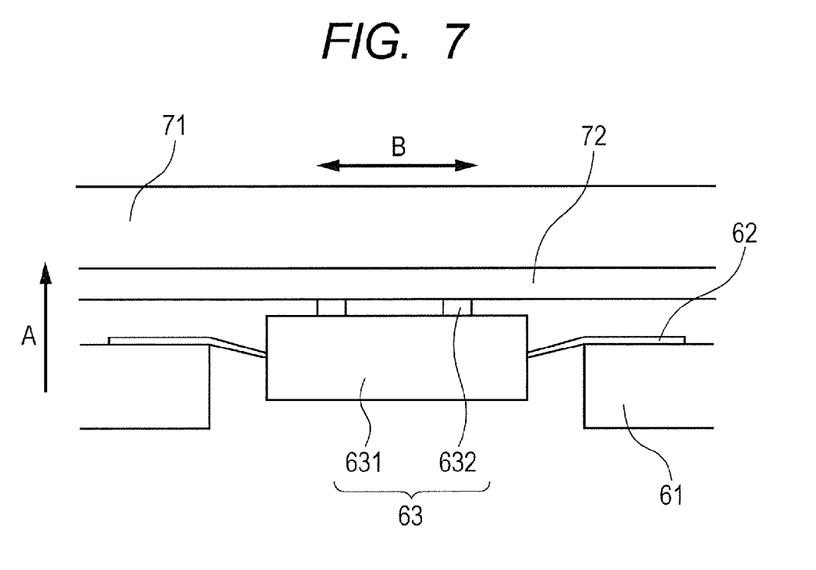
FIG. 7 is a partially enlarged view of the drive unit and the vicinity thereof according to the second embodiment.

Hereinafter, a second embodiment of the present invention is described in detail with reference to FIGS. 6A, 6B, and 7.

Note that, in this embodiment, a drive unit has a structure different from that in the first embodiment. Other identical parts are denoted by the same reference numerals or symbols, and description thereof is omitted.

Instead of the attraction yoke 22 and the driving coil 23 of the fixed unit 2, a drive unit 8 of this embodiment includes three vibrational wave motors 63 fixed to a retaining plate 61 through an intermediation of leaf springs 62 substantially at every 120 degrees about the optical axis position of the correction lens 31, and three attraction magnets 64. In addition, instead of the permanent magnet 33 and the back yoke 34 of the movable unit 3 in the first embodiment, a movable unit 7 of this embodiment includes a slider 72 which is held in contact with the vibrational wave motor 63 and is fixed to a moving plate 71, and attraction plates 73 which are made of a magnetic material and are disposed at positions corresponding to the three attraction magnets 64.

The vibrational wave motor 63 includes a vibration portion 631 having an electromechanical energy conversion element, and a contact portion 632 formed integrally with the vibration portion 631 so as to come into contact with a portion to be driven. The vibration portion 631 generates a bending vibration and a stretching vibration through excitation, for example, and displacements caused by the individual vibrations are combined so that an ellipse or circle movement is generated at a tip of the contact portion 632. Then, the vibration movement is transmitted to the slider 72 via a friction force of the contact portion 632 so that a drive force can be generated.

Similarly to the first embodiment, the three balls 4 are interposed between the retaining plate 61 and the moving plate 71, and the attraction magnet 64 attracts the attraction plate 73. Thus, the movable unit 7 is supported in a relatively movable manner in a plane perpendicular to the optical axis while always maintaining a constant distance.

Next, a method of driving the movable unit 7 is described. FIG. 7 is a cross-sectional view of the vibrational wave motor 63 and the vicinity thereof. Under a state where a fixed unit 6 and the movable unit 7 are supported, the vibrational wave motor 63 is held in contact with the slider 72 of the moving plate 71 in a state where the leaf springs 62 fixed to the retaining plate 61 are bent. The contact portion 632 always receives a biasing force from the leaf spring 62 in a direction A in FIG. 7 so as to be held in contact with the slider 72, and a friction force always works on the contact surface. When the vibrational wave motor 63 performs the vibration movement, a drive force is transmitted to the slider 72 in a direction B so as to move the movable unit 7. The three vibrational wave motors 63 respectively perform the above-mentioned vibration movement to move the moving plate 71 in translational movement and rotate in the plane perpendicular to the optical axis.

In a method of locking the movable unit 7 in the non-image-stabilization state, the same control as in the first embodiment (FIG. 5) is performed, in which the movable unit 7 is rotated by a predetermined amount to a position at which the movable unit 7 is fitted with the fixed unit 6, and then the energization to the drive unit 8 is stopped so that the position of the correction lens 31 is retained. In the movable unit 7, the contact portion 632 of the vibrational wave motor 63 is always held in contact with the slider 72 of the movable unit 7 even when the energization is stopped, and hence the sliding friction force working constantly between the contact portion 632 and the slider 72 works as a retaining force for retaining the posture of the movable unit 7 with respect to the fixed unit 6.

With the above-mentioned structure, in addition to the effect of retaining the movable unit to the fixed unit by the sliding friction between the balls 4 and the ball reception portions 25 in the first embodiment, the retaining force by the sliding friction force of the contact portion 632 of the vibrational wave motor works constantly on the movable unit 7 even in the state without energization. Therefore, the optical axis of the movable unit 7 can be retained more securely at the position coincident with the optical axis of the lens apparatus.

In this way, compared to the conventional technology, it is not particularly necessary to provide a dedicated mechanism for retaining the movable unit so as not to move from a predetermined reference position (with respect to the fixed unit). Therefore, it is possible to obtain an effect of reducing the number of components.

By applying the lens driving unit of the present invention to an image stabilizing mechanism of the lens apparatus, or by using an image pickup apparatus including the lens apparatus to which the lens driving unit of the present invention is applied, it is possible to realize the lens apparatus and the image pickup apparatus that can provide the effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2011-239907, filed Nov. 1, 2011, which is hereby incorporated by reference herein in its entirety.

What is claimed is:

1. A lens driving unit for moving a lens in a lens apparatus in a direction perpendicular to an optical axis of the lens apparatus, the lens driving unit comprising:
   a fixed member;
   a movable member to which the lens is fixed, the movable member being movable in the direction perpendicular to the optical axis of the lens;
   a spacer interposed between the fixed member and the movable member;
   a biasing unit for biasing the movable member toward the fixed member;
   a position detector for detecting a position of the movable member with respect to the fixed member in the direction perpendicular to the optical axis of the lens;
   a driving unit for driving the movable member with respect to the fixed member in the direction perpendicular to the optical axis; and
   a controller for controlling the driving unit to drive the movable member based on the position of the movable member detected by the position detector,
   wherein the controller controls driving of the driving unit in a fixed state and a movable state where the fixed state and the movable state are different from each other in a relative rotational position between the fixed member and the movable member about an optical axis of the lens,
   wherein a relative movable range of the movable member in a direction perpendicular to the optical axis in the movable state is larger than the relative movable range of the movable member in the direction perpendicular to the optical axis in the fixed state,
   wherein the controller controls the driving of the driving unit based on a position of the movable member detected by the position detector in the movable state, and the controller controls the movable member and the fixed member so as not to contact to each other in the fixed state.

2. The lens driving unit according to claim 1, wherein the spacer comprises balls, which are held in contact with ball reception portions of one of the fixed member and the movable member at a plurality of points.

3. The lens driving unit according to claim 2, wherein the driving unit comprises a voice coil motor.

4. The lens driving unit according to claim 1, wherein the driving unit comprises a vibrational wave motor.

5. The lens driving unit according to claim 1, wherein the biasing unit comprises a permanent magnet fixed to one of the fixed member and the movable member.

6. The lens driving unit according to claim 1, wherein, in the fixed state, when the movable member moves from a predetermined reference position, the position detector detects an amount of movement of the movable member from the predetermined reference position, and the controller controls the driving unit to move the movable member to the predetermined reference position.

7. The lens driving unit according to claim 1, further comprising ball reception portions respectively comprising a hole, wherein the spacer comprises balls, which are respectively held in the holes of the ball reception portions.

8. The lens driving unit according to claim 1, wherein the fixed member includes a retaining plate having a fitting portion and a fit release portion, and the movable member includes a protrusion, and
   wherein the protrusion faces the fit release portion in the movable state.

9. The lens driving unit according to claim 8, wherein the protrusion faces the fitting portion in the fixed state.

10. The lens driving unit according to claim 9, wherein the protrusion is spaced apart from the fit release portion by a first distance in the movable state, and the protrusion is spaced apart from the fitting portion by a second distance less than the first distance in the fixed state.

11. The lens driving unit according to claim 9, wherein a width of the retaining plate at the fitting portion exceeds a width of the retaining plate at the fit release portion.

12. The lens driving unit according to claim 1, wherein the fixed member and the movable member do not contact each other in a direction of the rotation of the movable member.

13. The lens driving unit according to claim 1, wherein in the fixed state, in which the fixed member and the movable member do not contact each other, the controller controls the fixed member and the movable member such that no portion of the fixed member contacts any portion of the movable member or any element that moves together with the movable member.

14. The lens driving unit according to claim 1, wherein the controller receives a vibration amount of the lens apparatus,
in the movable state, the controller controls the driving of the driving unit based on the vibration amount and a position of the movable member detected by the position detector.

15. A lens apparatus, comprising:
a lens; and
a lens driving unit configured to move the lens in a direction perpendicular to an optical axis of the lens apparatus, the lens driving unit comprising:
a fixed member;
a movable member to which the lens is fixed, the movable member being movable in the direction perpendicular to the optical axis of the lens;
a spacer interposed between the fixed member and the movable member;
a biasing unit for biasing the movable member toward the fixed member;
a position detector for detecting a position of the movable member with respect to the fixed member in the direction perpendicular to the optical axis of the lens;
a driving unit for driving the movable member with respect to the fixed member in the direction perpendicular to the optical axis; and
a controller for controlling the driving unit to drive the movable member based on the position of the movable member detected by the position detector,
wherein the controller controls driving of the driving unit in a fixed state and a movable state where the fixed state and the movable state are different from each other in a relative rotational position between the fixed member and the movable member about an optical axis of the lens,
wherein a relative movable range of the movable member in a direction perpendicular to the optical axis in the movable state is larger than the relative movable range of the movable member in the direction perpendicular to the optical axis in the fixed state,
wherein the controller controls the driving of the driving unit based on a position of the movable member detected by the position detector in the movable state, and the controller controls the movable member and the fixed member so as not to contact to each other in the fixed state.

16. An image pickup apparatus, comprising:
a camera;
a lens configured to connect to the camera; and
a lens driving unit configured to move the lens in a direction perpendicular to an optical axis of the lens, the lens driving unit comprising:
a fixed member;
a movable member to which the lens is fixed, the movable member being movable in the direction perpendicular to the optical axis of the lens;
a spacer interposed between the fixed member and the movable member;
a biasing unit for biasing the movable member toward the fixed member;
a position detector for detecting a position of the movable member with respect to the fixed member in the direction perpendicular to the optical axis of the lens;
a driving unit for driving the movable member with respect to the fixed member in the direction perpendicular to the optical axis; and
a controller for controlling the driving unit to drive the movable member based on the position of the movable member detected by the position detector,
wherein the controller controls driving of the driving unit in a fixed state and a movable state where the fixed state and the movable state are different from each other in a relative rotational position between the fixed member and the movable member about an optical axis of the lens,
wherein a relative movable range of the movable member in a direction perpendicular to the optical axis in the movable state is larger than the relative movable range of the movable member in the direction perpendicular to the optical axis in the fixed state,
wherein the controller controls the driving of the driving unit based on a position of the movable member detected by the position detector in the movable state, and the controller controls the movable member and the fixed member so as not to contact to each other in the fixed state.

* * * * *